United States Patent Office 3,645,923
Patented Feb. 29, 1972

3,645,923
CARBODIIMIDE FOAM COMPOSITION AND PROCESS FOR THE PREPARATION THEREFOR
Peter T. Kan. Livonia, Mich., assignor to BASF Wyandotte Corporation, Wyandotte, Mich.
No Drawing. Filed Jan. 26, 1970, Ser. No. 5,985
Int. Cl. C07c *119/04;* C08g *53/08*
U.S. Cl. 260—2.5
9 Claims

ABSTRACT OF THE DISCLOSURE

Novel carbodiimide foams are prepared by condensing an organic polyisocyanate in the presence of a catalytically sufficient amount of a 2,4,6-tris(dialkanolamino)-s-triazine catalyst. The foams of the present invention are rigid, dense, cellular compositions which exhibit excellent flame retardancy and low smoking characteristics.

BACKGROUND OF THE INVENTION (1) Field of the invention

The present invention concerns cellular foam compositions and methods of preparation therefor. More particularly, the present invention concerns novel carbodiimide foam compositions and methods of preparation therefor. Even more particularly, the present invention concerns novel carbodiimide foam compositions prepared from the catalytic condensation of an organic polyisocyanate.

(2) Prior art

Various carbodiimide compositions and their methods of preparation have been described in the prior art. For example, U.S. Pat. No. 2,941,966 discloses a method for preparing polymeric carbodiimide self-supporting films by the catalytic reaction of an organic polyisocyanate in the presence of various phosphorus-containing catalytic compounds. In U.S. Pat. No. 3,152,162 there is disclosed the preparation of liquid polyisocyanate-carbodiimide adducts by the autocatalytic decomposition of various polyisocyanates selected from the diphenyl methane polyisocyanate series. However, applicant is unaware of any previous disclosure which would suggest the preparation of carbodiimide cellular foam compositions by the catalytic condensation of an organic polyisocyanate.

It will be appreciated by those skilled in the art that the preparation of a foam from organic polyisocyanates, alone, obviates the need for several reactive groups and/or reaction steps which were heretofore required to produce a foam composition. In other words, in order to produce a foam composition by applicant's invention, it is no longer necessary to have the inter-molecular reaction of reactive hydrogens, isocyanates, water and the like which are usually associated with various techniques such as prepolymer methods and the like. Moreover, as will subsequently be shown, the present invention obviates the need for the addition of blowing agents to the reaction system for foam formation. By eliminating the need for several ingredients as well as several reaction steps which were heretofore required to produce a foam, a simple as well as economical method of producing a cellular foam is thereby provided.

Other advantages accruing to applicant's invention are provided by the foam compositions themselves. The foam compositions of the present invention are rigid cellular plastics which are suitable replacements for the heretofore known foams in many applications such as insulating material and the like. In addition, it has been found that the foam compositions of the present invention exhibit excellent flame retardancy and low smoke densities.

SUMMARY OF THE INVENTION

In accordance with the present invention, it has now been discovered that when an organic polyisocyanate is condensed at a temperature ranging from about 70° C. to 200° C., and in the presence of a catalytically sufficient amount of a 2,4,6-tris-(dialkanolamino)-s-triazine a novel rigid foam composition characterized by carbodiimide linkages is thereby produced.

Generally, from about 0.1 to 10 parts of catalyst per 100 parts of organic polyisocyanate are employed in the preparation of the foam compositions of the present invention. Although the reaction can be conducted at either atmospheric, superatmospheric or subatmospheric pressures, it is preferred to employ atmospheric pressure.

For a more detailed description of the present invention reference is made to the following detailed description and examples thereof.

DESCRIPTION OF THE PREFERRED EMBODIMENTS

The present invention, as mentioned, provides novel rigid foam compositions which are prepared from the catalytic condensation of an organic polyisocyanate in the presence of a 2,4,6-tris(dialkanolamino)-s-triazine catalyst. It appears that the foam forming reaction of the present invention proceeds in accordance with the following equation:

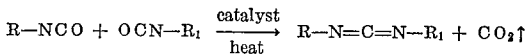

$$R-NCO + OCN-R_1 \xrightarrow[\text{heat}]{\text{catalyst}} R-N=C=N-R_1 + CO_2\uparrow$$

wherein R and $R_1$ are each polyvalent organic radicals which may be the same or different. The evolution of carbon dioxide by the reaction provides a sufficient blowing agent for inducing and promoting foam formation. Thus, one readily apparent advantage of the present invention is seen to be the elimination of the need for the addition of any blowing agents to the reaction. Furthermore, the reaction is exothermic and the heat generated therefrom also promotes foam formation. But it is the self-evolution of carbon dioxide which is essential in the formation of the foams of the present invention.

The precise role of the 2,4,6-tris(dialkanolamino)-s-triazine catalyst plays in the present invention is not known. However, it is known that this catalyst is quite specific in the foam formation reaction, i.e., other types of well-known catalysts employed in polyurethane and polyisocyanurate foam forming reactions are not operable herein.

As stated above, the foam compositions of the present invention are characterized by —N=C=N— linkages. Less dominant groups within the foams are —NCO and isocyanurate linkages. However, it is the carbodiimide linkages which are critical hereto and which impart the excellent physical properties to the foam composition of the present invention.

The organic polyisocyanates which are advantageously employed in the present invention can be represented by the formula:

$$R(NCO)_z$$

wherein R is a polyvalent organic radical selected from the group of aliphatic, aromatic and alkylaryl organic radicals. O is oxygen and z is an integer corresponding to the valence number of R and is at least 2. Representative organic polyisocyanates contemplated herein include, for example, the aromatic diisocyanates, such as: 2,4-toluene diisocyanate, 2,6-toluene diisocyanate, mixtures of 2,4- and 2,6-toluene diisocyanate, crude toluene diisocyanate, methylene diphenyl diisocyanate; the aromatic triisocyanates such as 3,3',3''-triphenylmethane triisocyanate; the aromatic tetraisocyanates and the like; alkylaryl polyisocyanates such as xylylene diisocyanates; aliphatic polyisocyanates such as lysine diisocyanate methyl ester and the like, and mixtures thereof. In addition, a blend of any of the above as well as mixtures thereof and crude methylene diphenyl diisocyanate may be used herein.

These polyisocyanates are prepared by conventional methods known in the art such as the phosgenation of the corresponding organic amine. Still another class of organic polyisocyanates contemplated by the present invention are the so-called "quasi-prepolymers." These are prepared by reacting an excess of any of the above-enumerated organic polyisocyanates or mixtures thereof with a minor amount of an organic polyol. These polyols, which can be either polyether polyols or polyester polyols, and their methods of preparation are well known in the art. The use of any one specific polyol is not critical hereto, rather any polyol that can be used to prepare a quasi-prepolymer can be employed herein. Generally speaking, the quasi-prepolymers are prepared by reacting an organic polyisocyanate with a minor amount, usually about 5% to 15% by weight, based on the weight of the polyisocyanate, of the polyol. In the practice of the present invention it is preferred to employ an 80:20 mixture of 2,4- and 2,6-toluene diisocyanate.

The specific catalyst, employed in the present invention, as hereinbefore noted, consists of a 2,4,6-tris(dialkanolamino)-s-triazine. Examples of the catalyst include 2,4,6-tris-(diethanolamino)-s-triazine, 2,4,6-tris(diisopropanolamino)-s-triazine; 2,4,6-tris(dibutanolamino)-s-triazine and the like as well as mixtures thereof. In fact any of the homologues of 2,4,6-tris(diethanolamino)-s-triazine exhibit utility in the present invention. It is preferred, however, to employ 2,4,6-tris(diethanolamino)-s-triazine. Preparation of these triazine catalysts generally comprises condensing cyanuric chloride with the selected dialkanol amine in the presence of a neutralizing amount of sodium hydroxide. Thus, for example, 2,4,6-tris-(diethanolamino)-s-triazine is prepared from the condensation of diethanolamine and cyanuric chloride in the presence of a neutralizing amount of sodium hydroxide. The triazine compounds and their methods of preparation are more fully described by Kaiser et al. Journal of the American Chemical Society, v. 73, p. 2984 (1951). In the practice of the present invention, a catalytic amount of the triazine catalyst consists of from about 0.1 to 10 parts by weight of the catalyst, based on 100 parts by weight of the polyisocyanate. Preferably, from about 0.5 to 3.0 parts by weight of catalyst based on 100 parts by weight of polyisocyanate is employed herein.

In accordance with the present invention, the foam compositions of the present invention are prepared by gradually heating the organic polyisocyanate in the presence of the catalyst at a temperature ranging from about 70° C. to 200° C. Preferably, the reaction is conducted over a temperature gradient ranging from about 80° C. to 120° C. Although the reaction can be carried out at atmospheric, superatmospheric or subatmospheric pressures, it is preferred to employ atmospheric pressures.

As noted previously, the reaction is exothermic. This exotherm is evidenced by an increase in temperature in the reaction environment as well as being accompanied by foam formation. The gradual heating of polyisocyanate reagent is conducted over a period of from about 3 to 120 minutes and usually from about 5 to 60 minutes, after which time the exotherm becomes evident. The required time to complete the reaction is, of course, dependent on the type of polyisocyanate and amount of catalyst employed.

Various other ingredients can be incorporated into the rigid foams of the present invention to enhance the properties thereof. For example, minor amounts of active ingredients such as organic polyols can be employed. Generally from about 1 to 20 parts by weight of polyol per 100 parts by weight of polyisocyanate can be used herein. In addition, various surfactants, plasticizers and filler materials can also be employed herein in amounts ranging from 1 to 75 parts by weight of each per 100 parts by weight of polyisocyanate.

The organic polyols that can be used as a separate ingredient are the same as those used in the formation of the above-mentioned "quasi-prepolymer." Exemplificative of such organic polyols are the polyhydric alcohols, the polyether polyols prepared by oxyalkylating polyhydric alcohols; polyester polyols prepared from the reaction of a polycarboxylic acid and a polyhydric alcohol; the oxyalkylation adducts of the polyester polyols; various phosphorous containing polyols and the like. Also included within the possible polyols are the mercapto-compounds such as dithiols and the like.

Representative of the surfactants are the well-known silicon-based polysiloxane surfactants.

Filler materials such as calicum carbonate, barium sulfate, calcium oxide and the like can be employed in the foam preparation. Also, plasticizers such as tris(beta-chloroethyl) phosphate and dioctyl phthalate are contemplated for use herein.

The final foam products obtained by the practice of the present invention generally have densities ranging from about 0.5 to 20.0 lbs./cu. ft. and usually from about 0.8 to 16.0 lbs./cu. ft.

To more fully illustrate the present invention, following are specific examples of the present invention which are not to be construed as being unduly limitative thereof. In the examples, all parts are by weight, absent indications to the contrary.

EXAMPLE 1

This example illustrates the preparation of a carbodiimide foam composition in accordance with the present invention.

To a suitable reaction vessel seated atop a heating means and equipped with a magnetic stirrer was charged a mixture of 50 parts of a toluene dioscyanate and 0.5 part of a 2,4,6-tris(diethanolamino)-s-triazine catalyst.

The mixture was maintained at a temperature of about 100° C. and under constant, slow stirring. After about 30 minutes an exotherm occurred which was accompanied with the evolution of carbon dioxide and foam formation. The peak temperature reached by the exotherm was 181° C. After about 60 minutes the reaction was completed. Upon completion of the reaction, a rigid foam, suitable as insulative material, was obtained.

EXAMPLE 2

The procedure of Example 1 was repeated using 0.5 part of a 2,4,6-tris(diisopropanolamino)-s-triazine catalyst in lieu of the 2,4,6-tris(diethanolamino)-s-triazine catalyst of Example 1. This reaction was conducted over a temperature parameter of about 90° C. to 135° C.

In this example, the exotherm occurred after about 60 minutes and reached a maximum temperature of about 205° C.

The final product was a rigid foam, characterized by carbodiimide linkages, suitable as insulation and the like.

EXAMPLES 3–7

Following the procedure of Example 1, a series of carbodiimide foams were prepared by condensing different organic diisocyanates and blends thereof in the presence of 2,4,6-tris(diethanolamino)-s-triazine. These diisocyanates and the amounts thereof, as well as the reaction conditions, are tabulated below in Table I. The temperature employed in preparing the foams of this example ranged from about 100° C. to 105° C.

In each instance a rigid foam characterized by carbodiimide linkages was obtained. These foams were quite suitable as insulating materials and the like.

TABLE I.—CARBODIIMIDE FOAM PREPARATION

| Example | Isocyanate reactant | Amount of isocyanate reactant, in parts | Amount of catalyst, in parts | Time to exotherm occurrence, in minutes | Maximum exotherm temp., °C. |
|---|---|---|---|---|---|
| 3 | Toluene diisocyanate / Methylene diphenyl diisocyanate | 25 / 25 | 0.5 | 25 | 182 |
| 4 | Xylene diisocyanate | 50 | 1.5 | 37 | 225 |
| 5 | Toluene diisocyanate / Xylene diisocyanate | 25 / 25 | 1.0 | 15 | 212 |
| 6 | Toluene diisocyanate / Xylene diisocyanate | 33 / 17 | 1.0 | 6 | 262 |
| 7 | Lysine diisocyanate-methyl ester | 50 | 1.5 | 32 | 173 |

The following examples, Examples 8–27, illustrate the preparation of various carbodiimide foams wherein various inert and active ingredients have been added to the diisocyanate. In all the following examples the catalyst was 2,4,6-tris(diethanolamino)-s-triazine. In the preparation of each of the foams, the same procedure as outlined in Example 1 was employed, i.e., a mixture of the polyisocyanate, catalyst and other ingredients was charged to a suitable reaction vessel equipped with a magnetic stirrer and seated atop a suitable heating means. The mixture was maintained at a temperature ranging from about 100° C. to 105° C. under agitation until the exotherm occurred. In the examples, where indicated, the plasticizer consisted of tris(beta-chloroethyl) phosphate.

EXAMPLE 8

A rigid carbodiimide foam was prepared from the following ingredients.

Ingredient: Amount, in parts
Toluene diisocyanate _____ 50.0
Catalyst _____ 0.5
Plasticizer _____ 1.0

After 23 minutes, the exotherm occurred. The exotherm reached a peak temperature of 172° C.

EXAMPLE 9

A rigid carbodiimide foam was prepared from the following ingredients.

Ingredient: Amount, in parts
Toluene diisocyanate _____ 100.0
Catalyst _____ 1.0
Plasticizer _____ 5.0
BaSO₄, as a filler _____ 20.0

After an elapsed time of 23 minutes, the exotherm occurred reaching a maximum temperature of 186° C. The foam had a density of 1.64 lbs./cu. ft.

EXAMPLE 10

A rigid carbodiimide foam was prepared from the following ingredients.

Ingredient: Amount, in parts
Toluene diisocyanate _____ 100.0
Catalyst _____ 1.0
Plasticizer _____ 5.0
CaO, as a filler _____ 10.0

After an elapsed time of 3 minutes, the exotherm occurred and reached a maximum temperature of 191° C. The resulting foam had a density of 0.83 lb./cu. ft.

EXAMPLES 11–27

The following Table II sets forth a series of rigid carbodiimide foams prepared from various reactants.

TABLE II.—CARBODIIMIDE FOAM PREPARATION

| Example | Isocyanate Reactant | | Polyol reactant | | Catalyst, parts | Plasticizer, parts | Surfactant,[a] parts | Filler, parts | Reaction time at 100-105° C., minutes | Maximum reaction temp., °C. | Density, lb./cu. ft. |
|---|---|---|---|---|---|---|---|---|---|---|---|
| | Isocyanate | Parts | Polyol+ | Parts | | | | | | | |
| 11 | TDI[b] | 100 | | | 1.0 | 5.0 | | [j] 10 | 20 | 174 | 1.06 |
| 12 | TDI | 100 | | | 1.0 | 5.0 | | [j] 20 | 16 | 190 | 1.63 |
| 13 | TDI | 142.5 | [h] 1,010 | 7.5 | 1.5 | 4.0 | | | 23 | 197 | 0.84 |
| 14 | TDI | 142.5 | [i] 2,010 | 7.5 | 1.5 | 4.0 | | | 29 | 188 | 0.93 |
| 15 | Prepolymer[c] | 100 | | | 1.0 | 5.0 | | [k] 25 | 20 | 183 | 2.16 |
| 16 | do[d] | 100 | | | 1.0 | 5.0 | | [k] 25 | 20 | 187 | 1.33 |
| 17 | TDI[c] / Prepolymer[e] | 99 / 51 | | | 1.5 | 7.5 | | | 40 | 211 | 3.37 |
| 18 | TDI / Crude MDI[f] | 60 / 12 | | | 1.0 | 3.6 | | | 38 | 182 | 1.28 |
| 19 | TDI / Crude MDI | 150 / 75 | | | 4.5 | 11.4 | | | 25 | 192 | 6.73 |
| 20 | TDI / Crude MDI | 165 / 55 | | | 4.4 | 11.0 | | [k] 55 | 12 | 210 | 8.54 |
| 21 | TDI / Crude MDI | 300 / 150 | | | 12.0 | 30.0 | | [k] 90 | 46 | 217 | 16.00 |
| 22 | TDI / Crude MDI | 75 / 75 | | | 4.5 | 7.5 | 0.75 | | 45 | 184 | 5.39 |
| 23 | TDI / Crude MDI | 150 / 150 | | | 9.0 | 15.0 | 1.5 | [j] 15 | 47 | 143 | 9.56 |
| 24 | Crude TDI | 100 | | | 1.0 | | | | 25 | 182 | |
| 25 | do | 150 | | | 4.5 | 7.5 | 0.75 | [j] 7.5 | 17 | 178 | 3.67 |
| 26 | Crude TDI / Crude MDI | 160 / 40 | | | 6.0 | 10.0 | | [j] 10 | 37 | 176 | 7.99 |
| 27 | Crude TDI / Crude MDI / DPEDA[g] | 200 / 50 / 12.5 | | | 7.5 | 12.5 | | [j] 12.5 | 54 | 145 | 8.22 |

[a] A polysiloxane surfactant.
[b] TDI=toluene diisocyanate.
[c] Prepared from 10/1 parts of TDI and a polypropylene glycol having an average molecular weight of 400.
[d] Prepared from 10/1 parts of TDI and a polypropylene glycol having an average molecular weight of 1,000.
[e] Prepared from 85/15 parts of TDI and a sucrose polyol prepared by oxypropylating sucrose to an average molecular weight of about 800.
[f] MDI=methylene diphenyl diisocyanate.
[g] N,N'-diphenylethylene diamine.
[h] A polyoxypropylene glycol polyol having an average molecular weight of 1,050.
[i] A polyoxypropylene glycol polyol having an average molecular weight of 2,000.
[j] CaCO₃.
[k] CaO.

EXAMPLE 28

This example illustrates the excellent flame retardancy and low smoke characteristics of the foams of the present invention.

The foams of Examples 9–23 and 25–27 were flame tested in accordance with the Butler Chimney Test as described by Krueger et al., SPE 25th Antec, v. XIII, Detroit, Mich., 1967, pp. 1052–1057. The results of this test are set forth below in Table III.

TABLE III.—BUTLER CHIMNEY TEST

| Example foam: | Percent weight retention | Flame height [1] | Smoke |
|---|---|---|---|
| 9 | 83 | C− | Moderate. |
| 10 | 70 | C+ | Moderate-light. |
| 11 | 78 | C− | Moderate. |
| 12 | 83 | C− | Do. |
| 13 | 58 | D | Light. |
| 14 | 57 | D | Moderate. |
| 15 | 77 | D | Do. |
| 16 | 60 | D | Do. |
| 17 | 78 | C+ | Do. |
| 18 | 78 | C− | Light. |
| 19 | 97 | B–A | Moderate-light. |
| 20 | 98 | B | Light. |
| 21 | 99 | A | Do. |
| 22 | 97 | A | Do. |
| 23 | 98 | B | Do. |
| 25 | 82 | D | Moderate. |
| 26 | 96 | C− | Light. |
| 27 | 95 | C+ | Do. |

[1] Flame height code:
A = 0 to 2″ flame height.
B = 2 to 5″ flame height.
C− = 5 to 7″ flame height.
C+ = 7 to 10″ flame height.
D = 10″ and above flame height.

It can be seen from the above table that these foams are in most instances quite flame retardant and in all instances low smoking. In addition, all the foams exhibit excellent weight retention.

What is claimed is:

1. A process for the preparation of a rigid cellular foam characterized by carbodiimide linkages which comprises condensing organic polyisocyanate in the presence of a catalytically sufficient amount of 2,4,6-tris(dialkanolamino)-s-triazine catalyst.

2. The process of claim 1 wherein the organic polyisocyanate is represented by the formula:

$$R(NCO)_z$$

wherein R is a polyvalent organic radical and z is an integer corresponding to the valence of R and is at least 2.

3. The process of claim 2 wherein R is selected from the group consisting of aliphatic, aromatic, and alkylaryl organic radicals.

4. The process of claim 3 wherein the organic polyisocyanate is selected from the group consisting of toluene diisocyanate, crude toluene diisocyanate, crude methylene diphenyl diisocyanate, methylene diphenyl diisocyanate, xylylene diisocyanate, lysine diisocyanate methyl ester, and mixtures thereof.

5. The process of claim 4 wherein the organic polyisocyanate is an 80:20 mixture of 2,4- and 2,6-toluene diisocyanate.

6. The process of claim 1 wherein the catalyst is present in amount ranging from about 0.1 to 10.0 parts, by weight, per 100 parts by weight of the organic polyisocyanate.

7. The process of claim 1 wherein the catalyst is 2,4,6-tris(diethanolamino)-s-triazine, 2,4,6-tris(disopropanolamino)-s-triazine, the homologues of 2,4,6-tris(diethanolamino)-s-triazine or mixtures thereof.

8. The process of claim 7 wherein the catalyst is 2,4,6-tris(diethanolamino)-s-triazine.

9. The process of claim 7 wherein the catalyst is 2,4,6-tris(diisopropanolamino)-s-triazine.

References Cited
UNITED STATES PATENTS

| 2,853,473 | 9/1958 | Campbell et al. | 260—2.5 |
| 2,941,966 | 6/1960 | Campbell et al. | 260—2.5 |
| 2,993,870 | 7/1961 | Burkus | 260—2.5 |
| 3,462,381 | 8/1969 | Eaton et al. | 260—2.5 |
| 3,502,722 | 3/1970 | Neumann | 260—77.5 |

DONALD E. CZAJA, Primary Examiner

E. C. RZUCIDLO, Assistant Examiner

U.S. Cl. X.R.

260—2.5 AP, 2.5 AW